(12) United States Patent
Takeda et al.

(10) Patent No.: US 12,320,288 B2
(45) Date of Patent: Jun. 3, 2025

(54) EXHAUST GAS PURIFICATION CATALYST, METHOD OF PURIFYING EXHAUST GAS, AND METHOD OF MANUFACTURING EXHAUST GAS PURIFICATION CATALYST

(71) Applicant: UMICORE SHOKUBAI JAPAN CO., LTD., Tokoname (JP)

(72) Inventors: Yasuyuki Takeda, Kobe (JP); Shigekazu Minami, Kobe (JP)

(73) Assignee: UMICORE SHOKUBAI JAPAN CO., LTD., Tokoname (JP)

( * ) Notice: Subject to any disclaimer, the term of this patent is extended or adjusted under 35 U.S.C. 154(b) by 524 days.

(21) Appl. No.: 17/641,174

(22) PCT Filed: Oct. 6, 2020

(86) PCT No.: PCT/JP2020/037863
§ 371 (c)(1),
(2) Date: Mar. 8, 2022

(87) PCT Pub. No.: WO2021/075316
PCT Pub. Date: Apr. 22, 2021

(65) Prior Publication Data
US 2022/0341356 A1    Oct. 27, 2022

(30) Foreign Application Priority Data

Oct. 18, 2019    (JP) .................................. 2019-191487

(51) Int. Cl.
*B01J 21/04*        (2006.01)
*B01D 53/94*      (2006.01)
(Continued)

(52) U.S. Cl.
CPC .......... *F01N 3/2803* (2013.01); *B01D 53/945* (2013.01); *B01J 21/04* (2013.01);
(Continued)

(58) Field of Classification Search
CPC ... B01J 23/10; B01J 23/40; B01J 23/42; B01J 23/44; B01J 23/46; B01J 37/04;
(Continued)

(56) References Cited

U.S. PATENT DOCUMENTS 4,585,752 A * 4/1986 Ernest ...................... B01J 37/04
                                                                       502/328
4,675,308 A * 6/1987 Wan ......................... B01J 37/04
                                                                       502/302
(Continued)

FOREIGN PATENT DOCUMENTS

EP              0 203 525 A1    12/1986
JP          H10-249198 A      9/1998
(Continued)

OTHER PUBLICATIONS

International Search Report for PCT/JP2020/037863, dated Dec. 22, 2020 (5 pgs.).
(Continued)

*Primary Examiner* — Cam N. Nguyen
(74) *Attorney, Agent, or Firm* — Smith, Gambrell & Russell, LLP

(57) ABSTRACT

In an exhaust gas purification catalyst, a catalytic component containing a first oxide, a second oxide, and a precious metal is supported on a three-dimensional structure; the ratio of the amount of precious metal supported on the first oxide to the total amount of precious metal supported on the first oxide and precious metal supported on the second oxide, or the ratio of the amount of precious metal supported on the second oxide to the total amount of precious metal supported on the first oxide and precious metal supported on the second oxide is 70% or more to 100% or less, as measured by an electron probe microanalyzer (EPMA); and the amount of
(Continued)

carbon monoxide that the precious metal can adsorb per unit mass is 15 mL/g or more to 100 mL/g or less.

21 Claims, 2 Drawing Sheets

(51) Int. Cl.
| | |
|---|---|
| *B01J 23/10* | (2006.01) |
| *B01J 23/40* | (2006.01) |
| *B01J 23/42* | (2006.01) |
| *B01J 23/44* | (2006.01) |
| *B01J 23/46* | (2006.01) |
| *B01J 23/63* | (2006.01) |
| *B01J 37/04* | (2006.01) |
| *B01J 37/16* | (2006.01) |
| *F01N 3/28* | (2006.01) |

(52) U.S. Cl.
CPC ............ *B01J 23/10* (2013.01); *B01J 37/04* (2013.01); *B01J 37/16* (2013.01); *B01D 2255/2065* (2013.01); *B01D 2255/2092* (2013.01); *B01D 2258/01* (2013.01)

(58) Field of Classification Search
CPC ......... B01J 23/63; B01J 37/16; B01D 53/945; F01N 3/2803
USPC ................ 502/304, 332–334, 339, 355, 415
See application file for complete search history.

(56) References Cited

U.S. PATENT DOCUMENTS

| | | | | |
|---|---|---|---|---|
| 4,678,770 A * | 7/1987 | Wan | ..................... | B01D 53/945 502/302 |
| 4,708,946 A | 11/1987 | Ohata et al. | | |
| 4,714,694 A * | 12/1987 | Wan | ......................... | B01J 23/63 502/355 |
| 4,727,052 A * | 2/1988 | Wan | ......................... | B01J 23/63 502/328 |
| 4,839,146 A * | 6/1989 | Cho | ......................... | B01J 23/63 502/303 |
| 5,286,699 A * | 2/1994 | Ohata | ...................... | B01J 23/63 502/527.19 |
| 5,494,878 A * | 2/1996 | Murakami | ............ | B01J 37/0244 502/328 |
| 5,576,053 A * | 11/1996 | Senda | ..................... | C23C 18/36 427/304 |
| 5,597,771 A * | 1/1997 | Hu | ............................ | F01N 3/10 502/333 |
| 5,750,082 A * | 5/1998 | Hepburn | .................. | B01J 35/19 502/328 |
| 5,948,376 A * | 9/1999 | Miyoshi | ................... | B01J 23/58 423/239.1 |
| 5,972,830 A * | 10/1999 | Yoshida | ................. | B01J 37/033 502/340 |
| 6,069,111 A * | 5/2000 | Yamamoto | ............... | B01J 23/89 502/341 |
| 6,150,288 A * | 11/2000 | Suzuki | ................. | B01J 37/0236 502/313 |
| 6,294,140 B1 * | 9/2001 | Mussmann | .......... | B01J 37/0244 502/514 |
| 6,395,675 B1 * | 5/2002 | Suga | .................... | B01J 23/8946 502/328 |
| 6,620,762 B2 * | 9/2003 | Tan | ......................... | B01J 23/63 502/302 |
| 6,756,336 B2 * | 6/2004 | Kasahara | ............. | B01D 53/865 502/64 |
| 7,498,288 B2 * | 3/2009 | Matsueda | ............. | B01J 23/002 502/328 |
| 7,598,205 B2 * | 10/2009 | Suzuki | ................... | B01J 23/002 502/355 |
| 7,759,279 B2 * | 7/2010 | Shiratori | .............. | B01J 37/0221 502/303 |
| 8,158,554 B2 * | 4/2012 | Wakamatsu | ......... | B01J 37/0201 502/328 |
| 8,389,435 B2 * | 3/2013 | Miura | ................... | B01J 37/0221 502/355 |
| 8,404,611 B2 * | 3/2013 | Nakamura | ............... | B01J 35/23 502/325 |
| 8,667,785 B2 * | 3/2014 | Blakeman | ................ | B01J 23/44 60/299 |
| 9,012,350 B2 * | 4/2015 | Aoki | ........................ | B01J 35/56 502/355 |
| 9,034,269 B2 * | 5/2015 | Hilgendorff | ......... | B01D 53/944 502/262 |
| 9,339,794 B2 * | 5/2016 | Nagashima | .......... | B01J 37/0244 |
| 9,433,927 B2 * | 9/2016 | Ikeda | ........................ | B01J 35/30 |
| 9,561,494 B2 * | 2/2017 | Kato | ....................... | B01J 21/066 |
| 9,597,663 B2 * | 3/2017 | Inoda | ........................ | B01J 23/58 |
| 9,616,386 B2 * | 4/2017 | Hatanaka | ................ | B01J 21/066 |
| 9,656,209 B2 * | 5/2017 | Chang | ..................... | B01J 23/464 |
| 9,855,550 B2 * | 1/2018 | Matsueda | ............. | B01J 23/8871 |
| 10,493,434 B2 * | 12/2019 | Grubert | ..................... | B01J 35/56 |
| 10,765,998 B2 * | 9/2020 | Katoh | ......................... | B01J 37/08 |
| 10,828,602 B2 * | 11/2020 | Sakurada | .................. | B01D 53/94 |
| 10,857,521 B2 * | 12/2020 | Sung | ...................... | B01J 29/7415 |
| 11,130,117 B2 * | 9/2021 | Gu | ............................. | B01J 23/63 |
| 11,179,701 B2 * | 11/2021 | Sakurada | .................. | B01J 35/19 |
| 11,207,642 B2 * | 12/2021 | Goodwin | ................ | F01N 3/035 |
| 11,285,467 B2 * | 3/2022 | Clowes | ..................... | B01J 23/10 |
| 11,358,127 B2 * | 6/2022 | Armitage | ............. | B01J 37/0234 |
| 11,667,575 B2 * | 6/2023 | Wu | ........................... | C04B 35/48 428/472 |
| 11,813,598 B2 * | 11/2023 | Sung | ........................ | F01N 3/103 |
| 11,904,299 B2 * | 2/2024 | Zheng | ................. | B01D 53/9477 |
| 2004/0028589 A1 * | 2/2004 | Reisinger | .................. | B01J 23/63 423/240 S |
| 2006/0217263 A1 * | 9/2006 | Kawamoto | ............... | B01J 35/19 502/325 |
| 2008/0242533 A1 | 10/2008 | Saito | | |
| 2009/0082199 A1 * | 3/2009 | Suzuki | ................. | B01D 53/945 502/343 |
| 2010/0008832 A1 * | 1/2010 | Oosumi | .................... | B01J 23/63 422/177 |
| 2010/0180581 A1 | 7/2010 | Grubert et al. | | |
| 2012/0295787 A1 * | 11/2012 | Ikeda | ................... | B01J 37/0244 502/304 |
| 2013/0333362 A1 * | 12/2013 | Phillips | ..................... | B01J 23/66 502/328 |
| 2013/0336864 A1 * | 12/2013 | Zheng | ..................... | B01J 37/031 502/415 |
| 2014/0234189 A1 * | 8/2014 | Clowes | ..................... | B01J 35/40 60/297 |
| 2015/0251165 A1 | 9/2015 | Nagao et al. | | |
| 2017/0291163 A1 | 10/2017 | Salto | | |
| 2017/0304805 A1 | 10/2017 | Xu et al. | | |
| 2018/0280878 A1 * | 10/2018 | Inoda | ....................... | B01J 35/19 |
| 2019/0186314 A1 * | 6/2019 | Sung | ........................ | F01N 3/035 |

FOREIGN PATENT DOCUMENTS

| | | |
|---|---|---|
| JP | 2003-245553 A | 9/2003 |
| JP | 2006-263582 A | 10/2006 |
| JP | 2006-181484 A | 7/2008 |
| JP | 2010-260046 A | 11/2010 |
| JP | 2017-164735 A | 9/2017 |
| JP | 2017-189736 A | 10/2017 |
| JP | 2018-510053 A | 4/2018 |
| WO | 2016/123534 A1 | 8/2016 |

OTHER PUBLICATIONS

Translation of the Written Opinion of the International Searching Authority mailed Dec. 22, 2020 for International Patent Application No. PCT/JP2020/037863 (4 pages).
Extended European Search Report dated Oct. 16, 2023 for European Patent Application No. 20876229.4 (8 pages).

(56) References Cited

OTHER PUBLICATIONS

Chinese Office Action dated Mar. 27, 2024 for Chinese Patent Application No. 202080063023.0 (7 pages in Chinese; 11 pages English translation).

* cited by examiner

EXHAUST GAS PURIFICATION CATALYST, METHOD OF PURIFYING EXHAUST GAS, AND METHOD OF MANUFACTURING EXHAUST GAS PURIFICATION CATALYST

TECHNICAL FIELD

The present invention relates to an exhaust gas purification catalyst, a method of purifying exhaust gas, and a method of manufacturing an exhaust gas purification catalyst.

BACKGROUND OF THE INVENTION

Due to exhaust gas regulations, exhaust gas emitted from internal combustion engines such as automobiles and the like must be purified to a high degree. For gasoline engine vehicles, a three-way catalyst is known, which simultaneously purifies the three components of carbon monoxide (CO), hydrocarbons (HC), and nitrogen oxides ($NO_x$) in exhaust gas. Typically, a three-way catalyst contains precious metal such as palladium or the like, an oxygen storage component (OSC) such as a cerium zirconium composite oxide or the like, and alumina serving as a support material for the precious metal. In the catalyst described above, a technology has been proposed in which precious metals are separated and supported on the alumina and the OSC so as to have the same mass ratio to the alumina and the OSC in order to prevent the sintering of precious metals and the alloying of precious metals when different precious metals are used (Patent Document 1). The aforementioned catalyst is developed in order to have catalytic activity at a certain consistency.

However, exhaust gas regulations are tightening worldwide year by year and are expected to tighten further in the future. For example, a catalyst having a function of purifying exhaust gas despite rapid changes in exhaust gas temperature from low to high temperatures can be presented. Therefore, there is a demand for the development of catalysts having superior exhaust gas purification performance.

The performance of a catalyst is known to be affected by the state of the catalytic metal. For example, as the oxidation number of the catalytic metal changes, the catalytic performance of the catalytic metal also changes. In order to control the state of the catalytic metal, a method of supporting a specific catalytic metal on a specific oxide is known. For example, in order to selectively support a precious metal on an oxide A in a catalyst using oxides A and B, a method is known where precious metal is supported on the oxide A in advance and then calcined to prepare a powder, and the prepared powder is mixed with a powder B, wash-coated onto a honeycomb support, and then calcined a second time to obtain a catalyst.

Furthermore, a method of creating a fine particle catalyst using a colloid has been disclosed for the purpose of improving the performance of a catalyst. It is disclosed that this method can be used to create thermally stable precious metal particles (Patent Document 2).

PRIOR ART DOCUMENTS

Patent Documents

Patent Document 1: Japanese Unexamined Patent Application Publication No. 2006-263582 A Patent Document 2: Japanese PCT Patent Application Publication No. 2018-510053

SUMMARY OF THE INVENTION

Technical Problem

In the conventional method, in order to support the catalytic metal on a particular oxide, a first calcination is performed, followed by mixing with another oxide, wash-coating, and then performing a second calcination. As a result, there was a problem with the conventional method where the precious metal supported by the first calcination is sintered by the second calcination. Furthermore, the state of the catalytic metal was not sufficiently controlled through the conventional method.

Furthermore, even if the conventional method using colloids is used to attempt to support a catalytic metal on a certain oxide, the precious metal was not sufficiently selectively loaded.

In view of the foregoing, an object of the present invention is to provide a catalyst selectively supported on a specific oxide without reducing the number of catalytic metals that can contact exhaust gas, and a method of manufacturing an exhaust gas purification catalyst capable of selectively supporting a catalytic metal.

Solution to the Problem

In order to solve the aforementioned problems, the present inventors conducted extensive studies. As a result, it was found that when a catalyst contains a plurality of types of oxide supports and precious metals, the performance of the catalyst can be improved by selectively supporting a specific precious metal on a specific oxide support. In view of the foregoing, the following aspects are employed in the present invention to solve the problems described above.

(1) In an exhaust gas purification catalyst according to a first aspect, a catalytic component containing a first oxide, a second oxide, and precious metal is supported on a three-dimensional structure; the ratio of the amount of precious metal supported on the first oxide to the total amount of precious metal supported on the first oxide and precious metal supported on the second oxide, or the ratio of the amount of precious metal supported on the second oxide to the total amount of precious metal supported on the first oxide and precious metal supported on the second oxide is 70% or more to 100% or less, as measured by an electron probe microanalyzer (EPMA); and the amount of carbon monoxide that the precious metal can adsorb per unit mass is 15 mL/g or more to 100 mL/g or less.

(2) In the exhaust gas purification catalyst according to the aforementioned aspect, the first oxide may contain aluminum.

(3) In the exhaust gas purification catalyst according to the aforementioned aspect, the second oxide may contain cerium.

(4) In the exhaust gas purification catalyst according to the aforementioned aspect, the first oxide may contain a rare earth element (excluding cerium).

(5) In the exhaust gas purification catalyst according to the aforementioned aspect, the second oxide may contain a rare earth element (excluding cerium).

(6) The exhaust gas purification catalyst according to the aforementioned aspect may further contain an alkali earth metal compound.

(7) The exhaust gas purification catalyst according to the aforementioned aspect may be obtained by a method including the following steps:

(S1) A first preparation step of preparing a first slurry containing a first oxide or second oxide and a precious metal solution.

(S2) A reducing step following the first preparation step of mixing the first slurry with a reducing agent to obtain a reducing slurry.

(S3) A second preparation step, following the reducing step, of preparing a second slurry, (a) containing the second oxide if the first oxide was used in the first preparation step, or (b) containing the first oxide if the second oxide was used in the first preparation step.

(S4) A mixing step following the second preparation step of mixing the reducing slurry and the second slurry to obtain a mixed slurry.

(S5) A supporting step following the mixing step of supporting the mixed slurry on a three-dimensional structure.

(8) A method of purifying exhaust gas according to a second aspect includes a step of causing exhaust gas to flow through the exhaust gas purification catalyst according to the aspect described above.

(9) A method of manufacturing an exhaust gas purification catalyst according to a third aspect, including: (S1) a first preparation step of preparing a first slurry containing a first oxide or second oxide and a precious metal solution; (S2) a reducing step of mixing the first slurry with a reducing agent to obtain a reducing slurry; (S3) a second preparation step following the reducing step of preparing a second slurry, (a) containing the second oxide if the first oxide was used in the first preparation step, or (b) containing the first oxide if the second oxide was used in the first preparation step; (S4) a mixing step following the second preparation step of mixing the reducing slurry and the second slurry to obtain a mixed slurry; and (S5) a supporting step following the mixing step of supporting the mixed slurry on a three-dimensional structure.

(10) In the method of manufacturing an exhaust gas purification catalyst according to the aforementioned aspect, the first preparation step may include a step of adding a protective agent which protects the precious metal.

(11) In the method of manufacturing an exhaust gas purification catalyst according to the aforementioned aspect, the first slurry may contain the first oxide, and the first preparation step may include a step of milling the first oxide.

(12) In the method of manufacturing an exhaust gas purification catalyst according to the aforementioned aspect, the second slurry may contain the second oxide, and the second preparation step may include a step of milling the second oxide.

(13) In the method of manufacturing an exhaust gas purification catalyst according to the aforementioned aspect, the reducing agent may be an organic compound.

(14) In the method of manufacturing an exhaust gas purification catalyst according to the aforementioned aspect, the reducing step may be performed at a temperature of 10° C. or more to 40° C. or less.

Advantageous Effects of the Invention

The exhaust gas purification catalyst according to the aspect described above can provide excellent exhaust gas purification performance.

Furthermore, the method of purifying exhaust gas according to the aspect described above can efficiently purify exhaust gas. Furthermore, the method of manufacturing an exhaust gas purification catalyst according to the aspect described above can provide an exhaust gas purification catalyst having excellent exhaust gas purification performance.

EMBODIMENTS OF THE INVENTION

The embodiments will be described in detail hereinafter with reference to the drawings as appropriate. To facilitate an understanding of the features of the present invention, the drawings used in the following descriptions may show enlarged portions serving as features, and the dimensional proportions of each of the components may differ from the actual dimensions. Materials, dimensions and the like indicated in the following descriptions are examples. The present invention is not limited thereto and may be implemented by making appropriate changes within a scope that does not change a gist of the present invention.

Exhaust Gas Purification Catalyst

Figure 1:
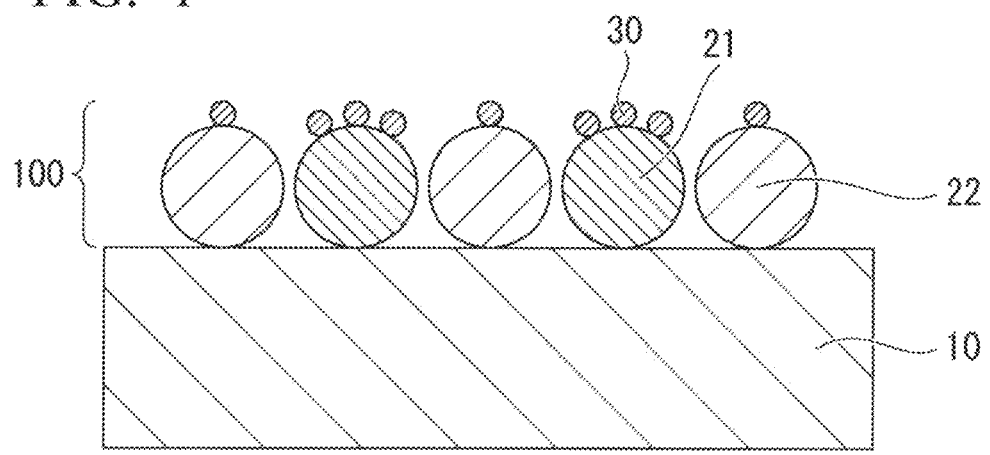
FIG. 1 is a cross-sectional schematic diagram of an exhaust gas purification catalyst according to the embodiments, in which a catalytic component 100 containing a first oxide 21 on which a precious metal 30 is supported and a second oxide 22 on which little of the precious metal 30 is supported on a three-dimensional structure 10.

FIG. 1 illustrates a cross-sectional schematic diagram of an exhaust gas purification catalyst according to the embodiments, in which a catalytic component 100 is supported on a three-dimensional structure 10. The catalytic component 100 according to the embodiments contains a first oxide 21, a second oxide 22, and a precious metal 30. The first oxide 21 and the second oxide 22 have different compositions. The catalytic component 100 of the present invention preferably at least partially covers the three-dimensional structure 10.

In the present invention, the precious metal 30 is capable of adsorbing a prescribed amount of carbon monoxide and is supported on the first oxide 21 or the second oxide 22 at a prescribed selective loading ratio. The selective loading ratio will be described later. Having such a structure allows support on an oxide that is suitable for a catalytic reaction. Furthermore, the ability to adsorb a prescribed amount of carbon monoxide means that a reaction gas can be adsorbed by the precious metal. In general, the amount of carbon monoxide that can be adsorbed by the precious metal 30 is proportional to the amount of reaction gas that the precious metal can adsorb. In other words, if the precious metal 30 can adsorb a suitable amount of carbon monoxide, a suitable amount of the reaction gas can be adsorbed on the precious metal 30 on a suitable oxide, and the reaction gas reacts advantageously. When the reaction gas is automotive exhaust gas, using the catalyst of the present invention allows for the purification reaction of the exhaust gas to proceed advantageously.

"Three-Dimensional Structure"

The catalytic component in the present embodiment is supported on a three-dimensional structure. The three-dimensional structure is a structure with inner openings through which exhaust gas can flow. The three-dimensional structure may be the same as that used in a typical exhaust gas purification catalyst.

The total length of the three-dimensional structure is not particularly limited, but is preferably 10 mm or more to 1000 mm or less, more preferably 15 mm or more to 300 mm or less, and even more preferably 20 mm or more to 150 mm or less. The three-dimensional structure may have a honeycomb-like structure. The "total length of the three-dimensional structure" is the length of the three-dimensional structure from an exhaust gas inlet side to an exhaust gas outlet side.

The number of holes (cells) in an end face of the three-dimensional structure may be set within an appropriate range in consideration of the type of the exhaust gas to be treated, gas flow rate, pressure loss, removal efficiency, and the like. For example, a cell density (number of cells/unit cross-sectional area) of 100 cells/square inch or more to 1200 cells/square inch or less is sufficient for use, and the cell density is preferably 200 cells/square inch or more to 900 cells/square inch or less and even more preferably 400 cells/square inch or more to 700 cells/square inch or less. The shape (cell shape) of the hole can be hexagonal, rectangular, triangular, corrugated, or the like.

The material of the three-dimensional structure may be the same as that used in a typical exhaust gas purification catalyst. The three-dimensional structure may be made of metal, ceramic, or the like, and preferably cordierite, stainless steel, silicon carbide (SiC), mullite, alumina (α-alumina), or silica. Cordierite, stainless steel, or SiC is more preferable. When the material of the three-dimensional structure is cordierite, stainless steel, or SiC, durability improves.

"Catalytic Component"

The catalytic component contains a first oxide, a second oxide, and a precious metal.

(First Oxide)

The first oxide can be a refractory inorganic oxide (excluding an oxygen storage material) or an oxygen storage material (OSC) normally used in an exhaust gas purification catalyst. The first oxide is preferably a refractory inorganic oxide. A refractory inorganic oxide is an inorganic oxide, excluding oxygen storage materials, which has a BET specific surface area of 10 m$^2$/g or more even when heated to 1000° C. or more in an air atmosphere. Examples of refractory inorganic oxides that may be used include α-alumina, γ-alumina, δ-alumina, η-alumina, θ-alumina, and other aluminas, zirconia, silicon oxide (silica), and other single oxides, zeolite, zirconia-alumina, lanthana-alumina, lanthana-zirconia, other composite oxides, and mixtures thereof. γ-alumina, θ-alumina, zirconia, zeolite, zirconia-alumina, and lanthana-alumina are preferable. The refractory inorganic oxide preferably contains aluminum, and most preferably lanthana-alumina. The refractory inorganic oxide is preferably porous.

A raw material of the first oxide can be an oxide, or a substance that becomes an oxide by drying or calcination after preparing a precursor by a precipitating method, hydrolyzing method, or the like. For example, a hydroxide, nitrate, carbonate, or the like can be used as the raw material of the first oxide, and an oxide is preferably used.

When the refractory inorganic oxide is used as the first oxide, rare earth elements such as lanthanum, yttrium, neodymium, praseodymium, or the like may be included. The rare earth elements included in the refractory inorganic oxide may be any rare earth element excluding cerium. When the refractory inorganic oxide contains a rare earth element, the heat resistance of the refractory inorganic oxide is improved. The amount of the rare earth elements included in the refractory inorganic oxide is the sum of the oxide equivalents of the rare earth elements (lanthanum oxide ($La_2O_3$), yttrium oxide ($Y_2O_3$), neodymium oxide ($Nd_2O_3$), and praseodymium oxide ($Pr_6O_{11}$)) in relation to the refractory inorganic oxide, and is preferably 0 mass % or more to 30 mass % or less, more preferably 2 mass % or more to 20 mass % or less, and even more preferably 3 mass % or more to 10 mass % or less.

The method of incorporating rare earth elements into the first oxide can be by means normally used in the field of catalyst preparation. Examples of methods that can be used include: (1) a method of impregnating the first oxide with a solution containing a water-soluble salt of the rare earth element, which is then dried or calcined: (2) a method of mixing a water-soluble salt serving as a raw material for the first oxide and a water-soluble salt of the rare earth element in an aqueous medium, which is then precipitated as a hydroxide by pH adjustment, and then dried or calcined: and the like.

The BET (Brunauer-Emmett-Teller) specific surface area of the first oxide is preferably 30 m$^2$/g or more to 1000 m$^2$/g or less, and more preferably 40 m$^2$/g or more to 700 m$^2$/g or less, and even more preferably 50 m$^2$/g or more to 300 m$^2$/g or less, in BET specific surface area measurement using nitrogen gas. When the first oxide has a BET specific surface area in the aforementioned range, precious metal can be dispersed and supported.

The average particle diameter of the first oxide is preferably 0.5 μm or more to 100 μm or less, more preferably 1 μm or more to 50 μm or less, and even more preferably 2 μm or more to 30 μm. When it is less than 0.5 μm, the viscosity increases when preparing a slurry, and wash-coating onto the three-dimensional structure becomes difficult, which is not preferable. Furthermore, when it is larger than 100 μm, the time required for wet milling when preparing a slurry is increased, resulting in an aggregation of precious metal and a reduction in the number of precious metal atoms that can contact the exhaust gas, which is not preferable. Herein, the average particle diameter of the first oxide and second oxide is the average value of the particle diameter (d50) measured by a commercially available device using laser diffraction.

When the catalytic component is supported on the three-dimensional structure, the supported amount of the first oxide should be an amount normally used for an exhaust gas purification catalyst. Specifically, the supported amount of the first oxide relative to the volume of the three-dimensional structure, is preferably 10 g/L or more (g/L; indicates the mass (g) of a supported component per one liter (L) of three-dimensional structure) to 200 g/L or less, more preferably 20 g/L or more to 100 g/L or less, and even more preferably 30 g/L or more to 50 g/L or less. By adopting a supported amount in this range, high catalytic performance can be achieved because exhaust gas can easily enter the exhaust gas purification catalyst.

An oxygen storage component (OSC) can be used as the first oxide. The oxygen storage component is a material that has a function of releasing oxygen under rich conditions where the exhaust gas has excess fuel relative to the theoretical air-fuel ratio, and adsorbing oxygen under lean conditions where the exhaust gas has insufficient fuel relative to the theoretical air-fuel ratio. The inclusion of the oxygen storage component in the exhaust gas purification catalyst enables the exhaust gas purification catalyst to exhibit high catalytic performance even when the exhaust gas atmosphere varies greatly between a reducing atmosphere and an oxidizing atmosphere. The oxygen storage component preferably contains cerium (Ce), and more preferably contains cerium dioxide ($CeO_2$). The oxygen storage component may further contain zirconium (Zr). When the oxygen storage component contains zirconium, heat resistance is improved. The oxygen storage component may be a solid solution of cerium dioxide and zirconium oxide ($ZrO_2$)($CeO_2$—$ZrO_2$). The solid solution of cerium dioxide and zirconium oxide is also referred to as ceria-zirconia solid solution ((Ce,Zr) $O_2$). The oxygen storage component can contain a rare earth element such as lanthanum, yttrium, neodymium, praseodymium, or the like (excluding cerium) so long as the oxygen release and oxygen adsorption capabilities are not impaired. For example, lanthanum-containing ceria-zirconia can be used as the oxygen storage component. For example, when cerium and zirconium are included in the OSC, cerium may be, in terms of $CeO_2$, 10 mass % or more to 90 mass % or less, preferably 30 mass % or more to 70 mass % or less, even more preferably 45 mass % or more to 55 mass % or less, and zirconium may be, in terms of $ZrO_2$, 10 mass % or more to 90 mass % or less, preferably 30 mass % or more to 70 mass % or less, and even more preferably 45 mass % or more to 55 mass % or less. Lanthanum, yttrium, neodymium and praseodymium may be 0 mass % or more to 10 mass % or less, and preferably 5 mass % or more to 8 mass % or less, respectively, in terms of $La_2O_3$, $Y_2O_3$, $Nd_2O_3$ and $Pr_6O_{11}$, relative to the OSC. Note that the sum of cerium ($CeO_2$ equivalent), zirconium ($ZrO_2$ equivalent), lanthanum ($La_2O_3$ equivalent), yttrium ($Y_2O_3$ equivalent), neodymium ($Nd_2O_3$ equivalent) and praseodymium ($Pr_6O_{11}$ equivalent) is 100 mass %.

When the oxygen storage component is used as the first oxide, the BET specific surface area of the oxygen storage component is 10 $m^2$/g or more to 300 $m^2$/g or less, and preferably 30 $m^2$/g or more to 160 $m^2$/g or less.

When the oxygen storage component is used as the first oxide, the average particle diameter of the oxygen storage component is 1 μm or more to 100 μm or less, and preferably 1 μm or more to 20 μm or less.

When the catalytic component is supported on the three-dimensional structure, the supported amount of the oxygen storage component should be an amount normally used for an exhaust gas purification catalyst. Specifically, the supported amount of the oxygen storage component is preferably 10 g/L or more to 200 g/L or less, more preferably 20 g/L or more to 150 g/L or less, and even more preferably 30 g/L or more to 80 g/L or less, relative to the volume of the three-dimensional structure. In particular, when the oxygen storage component contains cerium dioxide, the supported amount of the cerium dioxide is preferably 1 g/L or more to 150 g/L or less, more preferably 10 g/L or more to 120 g/L or less, and even more preferably 20 g/L or more to 50 g/L or less, relative to the volume of the three-dimensional structure. By adopting a supported amount in this range, fluctuations in the oxygen concentration of the exhaust gas can be suppressed, and thus high catalytic performance can be achieved.

(Second Oxide)

The second oxide can be a refractory inorganic oxide or an oxygen storage component, similar to the material of the first oxide. The second oxide is preferably an oxygen storage component. The refractory inorganic oxide and oxygen storage component may be the same material as the first oxide.

(First Oxide and Second Oxide)

Of the refractory inorganic oxides and oxygen storage components included in the catalytic component, the one with the largest mass ratio can be considered the first oxide and the one with the second largest mass ratio can be considered the second oxide. Furthermore, of the refractory inorganic oxides and oxygen storage components included in the catalytic component, the one with the largest mass ratio may be considered the second oxide and the one with the second largest mass ratio may be considered the first oxide.

The first oxide and the second oxide have different compositions. For example, (1) the first oxide may be an oxygen storage component and the second oxide may be a refractory inorganic oxide, (2) the first oxide may be a refractory inorganic oxide and the second oxide may be an oxygen storage component, (3) the first oxide and the second oxide may be refractory inorganic oxides with mutually different compositions, and (4) the first oxide and the second oxide may be oxygen storage components with mutually different compositions. Preferably, (5) the first oxide is a refractory inorganic oxide containing aluminum and a rare earth element, and the second oxide is an oxygen storage component containing cerium, and more preferably, (6) the first oxide is a refractory inorganic oxide containing lanthanum and aluminum, and the second oxide is an oxygen storage component containing lanthanum, zirconium and cerium. Note that the first oxide and the second oxide can be distinguished by the aforementioned EPMA due to the different elements contained in the first oxide and/or the second oxide.

The mass ratio of the second oxide to the first oxide is preferably 0.05 or more to 12 or less, more preferably 0.1 or more to 5 or less, and most preferably 0.5 or more to 2 or less. At 0.05 or more to 12 or less, the effect of selectively loading precious metal is easily exhibited, which is preferable.

(Precious Metal)

The precious metal can be any precious metal normally used for purifying exhaust gas, and is preferably one or more selected from a group consisting of platinum (Pt), palladium (Pd), and rhodium (Rh). A single precious metal may be used, or multiple precious metals may be used in combination. Depending on the purification target, the precious metal can be changed accordingly. For example, when treating hydrocarbon (HC), carbon monoxide (CO) and nitrogen oxide ($NO_x$), platinum or palladium and rhodium can be used, and palladium and rhodium are particularly preferable. Furthermore, platinum and/or palladium can be used for the treatment of HC or CO. The precious metal may be present in a metallic state with an oxidation number of 0, or in an oxide state.

The amount of precious metal can be changed based on the exhaust gas flow rate that passes through the catalyst per unit volume of the catalyst in unit time, the composition of the exhaust gas, and the like.

The amount of precious metal relative to the catalytic component is preferably 0.1% by mass or more to 30% by mass or less, more preferably 0.5% by mass or more to 20% by mass or less, and even more preferably 0.5% by mass or more to 10% by mass or less.

The amount of palladium relative to the catalytic component is preferably 0.1% by mass or more to 30% by mass or less, more preferably 0.5% by mass or more to 20% by mass or less, and even more preferably 0.5% by mass or more to 10% by mass or less.

The amount of platinum relative to the catalytic component is preferably 0.01% by mass or more to 20% by mass or less, more preferably 0.1% by mass or more to 10% by mass or less, and even more preferably 0.3% by mass or more to 6% by mass or less.

The amount of rhodium relative to the catalytic component is preferably 0.01% by mass or more to 10% by mass or less, more preferably 0.1% by mass or more to 5% by mass or less, and even more preferably 0.3% by mass or more to 3% by mass or less.

When the catalytic component is supported on the three-dimensional structure, the supported amount of precious metal in terms of metal, relative to the volume of the three-dimensional structure, is preferably 0.1 g/L or more to 30 g/L or less, more preferably 0.5 g/L or more to 10 g/L or less, and even more preferably 0.5 g/L or more to 5 g/L or less. By employing a supported amount in this range, sufficient purification performance can be achieved while avoiding an aggregation of precious metal.

The supported amount of palladium relative to the volume of the three-dimensional structure may be 0.1 g/L or more to 10 g/L or less, preferably 0.5 g/L or more to 5 g/L or less, and even more preferably 0.5 g/L or more to 3 g/L or less. By employing a supported amount in this range, sufficient purification performance can be achieved while avoiding an aggregation of palladium.

The supported amount of platinum relative to the volume of the three-dimensional structure may be 0.01 g/L or more to 10 g/L or less, preferably 0.1 g/L or more to 5 g/L or less, and even more preferably 0.3 g/L or more to 3 g/L or less. By employing a supported amount in this range, sufficient purification performance can be achieved while avoiding an aggregation of platinum.

The supported amount of rhodium relative to the volume of the three-dimensional structure may be 0.01 g/L or more to 10 g/L or less, preferably 0.1 g/L or more to 5 g/L or less, and even more preferably 0.3 g/L or more to 3 g/L or less. By employing a supported amount in this range, sufficient purification performance can be achieved while avoiding an aggregation of rhodium.

A raw material for the precious metal according to the present embodiment can be a precious metal salt that produces a precious metal by a reducing step described later. The precious metal salt can be a nitrate, halide, carboxylate, or the like. A precious metal salt that can produce fine precious metal particles is preferably used. The precious metal salt is preferably dissolved in water or any organic compound and used as a precious metal solution.

(Alkali Earth Metal Compound)

The catalytic component preferably contains an alkali earth metal compound. The alkali earth metal compound can be used in the form of an oxide, sulfate, carbonate, nitrate, and the like of an alkali earth metal (magnesium, calcium, strontium, barium, and the like), and a sulfate is particularly preferable. For example, the sulfate may be one or more selected from a group consisting of magnesium sulfate, calcium sulfate, strontium sulfate, and barium sulfate. The sulfate is preferably a barium sulfate. The inclusion of an alkali earth metal compound in the catalytic component can suppress the reduction of the palladium oxide to a metallic palladium at high temperatures.

The amount of the alkali earth metal compound relative to the catalytic component may be 0.1% by mass or more to 30% by mass or less, preferably 1% by mass or more to 20% by mass or less, and is more preferably 3% by mass or more to 10% by mass or less.

When the catalytic component is supported on the three-dimensional structure, the supported amount of the alkali earth metal in terms of metal, relative to the volume of the three-dimensional structure, compound may be 0.1 g/L or more to 30 g/L or less, preferably 1 g/L or more to 20 g/L or less, and even more preferably 3 g/L or more to 10 g/L or less.

(Other Components)

The catalytic component can contain another component based on the purification target. For example, the catalytic component may contain an inorganic binder to prevent detaching of the catalytic component from the three-dimensional structure. For example, boehmite, silica gel, zirconia gel, and the like can be used as an inorganic binder.

(Method of Calculating the Selective Loading Ratio on the First Oxide and the Selective Loading Ratio on the Second Oxide)

In the present application, the ratio of the amount of precious metal supported on the first oxide to the total amount of precious metal supported on the first oxide and precious metal supported on the second oxide may be referred to as the "selective loading ratio on the first oxide". Similarly, the ratio of the amount of precious metal supported on the second oxide to the total amount of precious metal supported on the first oxide and precious metal supported on the second oxide may be referred to as the "selective loading ratio on the second oxide".

In the present application, the selective loading ratio on the first oxide and the selective loading ratio on the second oxide are calculated by the following procedure based on values measured by an electron probe microanalyzer (EPMA). (1) The distribution of the first oxide, the distribution of the second oxide, and the distribution of precious metal are identified by EPMA measurements. (2) Next, a first region where both the first oxide and precious metal are detected and a second region where both the second oxide and precious metal are detected are identified. (3) The ratio of the "area of the first region" relative to the total of the "area of the first region" and the "area of the second region" is calculated. The calculated percentage is referred to as the "selective loading ratio on the first oxide" described above. (4) Similarly, the ratio of the "area of the second region" relative to the total of the "area of the first region" and the "area of the second region" is calculated. The calculated percentage is referred to as the "selective loading ratio on the second oxide" described above.

In the present embodiment, the ratio of the amount of precious metal supported on the first oxide to the total amount of precious metal supported on the first oxide and precious metal supported on the second oxide (selective loading ratio on the first oxide), or the ratio of the amount of precious metal supported on the second oxide to the above mentioned total amount (selective loading ratio on the second oxide) is 70% or more to 100% or less. In other words, precious metal is selectively supported on the first oxide or the second oxide. In the present embodiment, when the selective loading of precious metals on the first oxide or on the second oxide is within the range of 70% or more to 100% or less, a stronger interaction with the supported oxide can be expected. The selective loading ratio on the first oxide or the selective loading ratio on the second oxide is preferably 80% or more to 100% or less, more preferably 90% or more to 100% or less, and even more preferably 95% or more to 100% or less.

When the catalytic component contains multiple precious metals, at least one precious metal preferably satisfies the aforementioned ratio, and not all types of precious metals need to satisfy the aforementioned ratio. When the catalytic component contains multiple precious metals, each of the precious metals may independently satisfy the aforementioned relationship. In other words, for example, if the precious metal includes a first precious metal and a second precious metal, the first precious metal may be selectively supported on the first oxide and the second precious metal may be selectively supported on the second oxide.

Note that the aforementioned "area of the first region" and "area of the second region" are values obtained by EPMA. The measurement conditions for EPMA are described in detail in the section related to "Electron Beam Microanalyzer (EPMA)".

An observation sample for EPMA measurement may be obtained by the following method. In other words, the exhaust gas purification catalyst is secured using commercially available epoxy resin and polished using abrasive paper and diamond abrasive grains. Thereafter, the observation sample is obtained by performing carbon vapor deposition using a vacuum depositing device.

Figure 2:
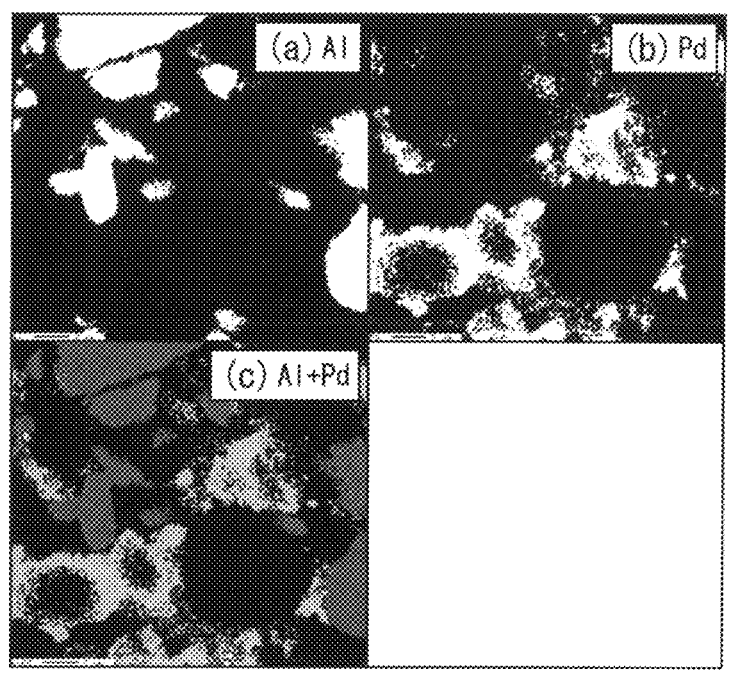
FIG. 2 is a diagram illustrating an example of observing the catalytic components with an electron probe microanalyzer (EPMA).
Figure 3:
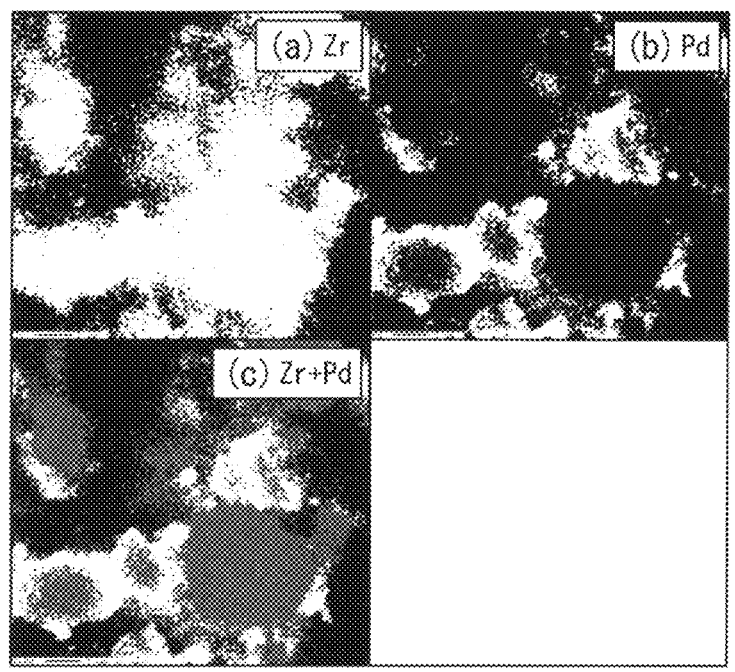
FIG. 3 is a diagram illustrating an example of observing the catalytic components with an electron probe microanalyzer (EPMA).

Examples of catalytic components, which contain alumina ($Al_2O_3$) as the first oxide, a ceria-zirconia solid solution ($CeO_2$—$ZrO_2$, (Ce, Zr) $O_2$) as the second oxide, and palladium as the precious metal, measured by EPMA, are illustrated in FIGS. 2 and 3.

A method of calculating the selective loading ratio on the first region and the first oxide is described below. FIG. 2(a) shows the measurement result of aluminum, and the white region indicates the distribution of alumina, which is the first oxide described above. FIG. 2(b) shows the measurement result of palladium, and the white region indicates the distribution of palladium, which is a precious metal. FIG. 2(c) is an image created by combining FIG. 2(a) and FIG. 2(b). In FIG. 2(c), a region where only aluminum was detected is indicated in dark gray, a region where only palladium was detected is indicated in light gray, and a region where both aluminum and palladium were detected is indicated in white. In other words, the white in FIG. 2(c) indicates the first region. In FIG. 2(c), the white first region is essentially nonexistent. The "area of the first region" can be obtained by an EPMA analysis software.

FIG. 3(a) shows the measurement result of zirconium, and the white region indicates the distribution of a ceria-zirconia solid solution, which is the second oxide described above. FIG. 3(b) shows the measurement result of palladium, and the white region indicates the distribution of palladium, which is a precious metal. FIG. 3(c) is an image created by combining FIG. 3(a) and FIG. 3(b). In FIG. 3(c), a region where only zirconium was detected is indicated in dark gray, a region where only palladium was detected is indicated in light gray, and a region where both zirconium and palladium were detected is indicated in white. In other words, the white in FIG. 3(c) indicates the second region. In FIG. 3(c), the white second region can be confirmed. The "area of the second region" can be obtained by the analysis software described above.

The ratio of the area of the first region in relation to the total area of the first region and the second region is the selective loading ratio on the first oxide. Similarly, the ratio of the area of the second region in relation to the total area of the first region and the second region is the selective loading ratio on the second oxide.

(Amount of CO Adsorbed)

The precious metal of the catalyst of the present embodiment is capable of adsorbing 15 ml/g or more to 100 ml/g or less of CO per unit mass of the precious metal. The precious metal of the catalyst is preferably capable of adsorbing 20 ml/g or more to 80 ml/g or less of CO per unit mass of the precious metal, and more preferably capable of adsorbing 30 ml/g or more to 50 ml/g or less of CO. When the amount of CO that can be adsorbed by the precious metal per unit mass is within the aforementioned range, the number of precious metal atoms which can contact the reaction gas during a catalytic reaction is large, which is preferable. In general, the higher the number of precious metal atoms that can come into contact with the reaction gas, the higher the reaction rate, which is preferable.

The amount of CO adsorbed per unit mass of precious metal can be determined by a pulse adsorption method described later.

[Manufacturing Method of Exhaust Gas Purification Catalyst]

The exhaust gas purification catalyst of the present invention will be described based on a manufacturing method. However, the exhaust gas purification catalyst of the present invention is not limited to the catalyst preparation method described below, so long as the method is capable of obtaining a catalyst having the effect of the exhaust gas purification catalyst of the present invention.

The method of manufacturing the exhaust gas purification catalyst according to the present embodiment is preferably a method including a first preparation step, a reducing step, a second preparation step, a mixing step, and a supporting step, and more preferably, (S1) a first preparation step, (S2) a reducing step, (S3) a second preparation step, (S4) a mixing step, and (S5) a supporting step are performed in that order. The first preparation step is a step of preparing a first slurry containing a first oxide or a second oxide and a precious metal solution. The reducing step is a step of mixing the first slurry with a reducing agent to obtain a reducing slurry. The second preparation step is a step of preparing a second slurry containing the second oxide if the first oxide is used in the first preparation step, or a step of preparing a second slurry containing the first oxide if the second oxide is used in the first preparation step. The mixing step is a step of mixing the reducing slurry and the second slurry to obtain a mixed slurry. The supporting step is a step of supporting the mixed slurry on the three-dimensional structure.

(First Preparation Step)

The first preparation step is a step of preparing a first slurry containing a precious metal solution and a first oxide or a second oxide. The first slurry is a uniform or non-uniform dispersion of precious metal and the first oxide or the second oxide in a solvent.

The first preparation step preferably includes a step of wet milling the dispersion liquid containing the first oxide or the second oxide. In other words, when the first slurry contains the first oxide, the first preparation step preferably includes a step of milling the first oxide. When coating a catalytic component on a three-dimensional structure, the three-dimensional structure is usually immersed in the slurry or the slurry is poured into the three-dimensional structure. At this time, if the diameter of secondary particles of the solid fraction in the slurry is large, there is a problem where gas permeation holes in the three-dimensional structure (channel in the case of a honeycomb carrier) may be blocked by secondary particles. Furthermore, if the secondary particle diameter of the solid fraction in the slurry is large, adhesion to the three-dimensional structure is inferior and the coated catalytic component may detach. In order to avoid these problems, wet milling is usually performed before coating onto the three-dimensional structure to reduce large particles.

In a conventional method, precious metal is supported on the first or second oxide, and then a slurry containing both oxides is prepared and wet milled. Therefore, it was difficult to support a precious metal with a high selective loading ratio because the precious metal on the first oxide transfers to the second oxide and vice versa during the wet milling process.

In the present invention, the first oxide or second oxide is wet milled and then the precious metal solution is added. By not wet milling the slurry again before wash-coating onto the three-dimensional structure, the transfer of precious metal from the first oxide to the second oxide or from the second oxide to the first oxide during a second wet milling is suppressed. A high selective loading ratio is achieved thereby.

Herein, wet milling can be performed by a known method, and a method can be used, in which the secondary particle diameter of the solid fraction in a solvent containing water or alcohol can be adjusted to 1 μm or more to 50 μm or less, and preferably 2 μm or more to 20 μm or less. Specifically, wet milling can be performed by a ball mill, a bead mill, or the like. The secondary particle diameter of the solid fraction after wet milling is preferably 1% or more to 90% or less, more preferably 2% or more to 70% or less, and most preferably 3% or more to 50% or less, of the secondary particle diameter of the solid fraction before wet milling.

The precious metal is dissolved in the precious metal solution. In other words, the precious metal is present as ions in the precious metal solution. All precious metals are preferably present as ions in the precious metal solution. The precious metal solution can be prepared, for example, by dissolving precious metal nitrate in water.

When a nitrate solution is used as the precious metal solution, the first preparation step preferably includes a step of adding nitric acid. The first oxide or second oxide and the precious metal solution and the nitric acid may be mixed in any order, but the first oxide or second oxide and the nitric acid are preferably mixed and then the precious metal solution is added and mixed.

The first slurry may be prepared by (a) mixing the precious metal solution and the first oxide or mixing the precious metal solution and the second oxide, and then dispersing the precious metal solution and the first oxide or the second oxide in the solvent by stirring, or (b) mixing a dispersion liquid in which the first oxide or the second oxide is dispersed into the solvent with the precious metal solution.

Herein, stirring refers to an operation of loosening the aggregated state of the aggregates, and the secondary particle diameter of the solid fraction after stirring is preferably 60% or more to 200% or less, more preferably 70% or more to 150% or less, and most preferably 80% or more to 120% or less, regarding the secondary particle diameter of the solid fraction before stirring.

When precious metal is also supported on the second oxide, the precious metal solution mixed with the first oxide and the precious metal solution mixed with the second oxide may be solutions of different precious metal species or solutions of the same precious metal species. For example, if a raw material solution of Pd is used for the first oxide, a raw material solution of Rh can be used for the second oxide.

The first preparation step preferably includes a step of adding a protective agent to protect the precious metal. The protective agent prevents precious metal nanoparticles from aggregating and promotes dispersion of the precious metal. The protective agent in the present embodiment is not particularly limited, and any protective agent capable of preventing the aggregation of precious metal nanoparticles may be used. For example, the protective agent may be a polymer, a surfactant, a compound having a ligand, or the like. The protective agent is preferably free of metallic elements, and the protective agent more preferably contains hydrogen, carbon, oxygen, and nitrogen. Examples of preferred protective agents include polyvinyl alcohols (PVA), polyvinylpyrrolidones (PVP), polyethyleneimines (PEI) and polyacrylic acids (PA).

The concentration of the protective agent in the precious metal solution can be determined in consideration of the surface activity and the interaction with the precious metal, and the concentration of the protective agent is preferably 0.05 or more to 5 or less, more preferably 0.1 or more to 3 or less, even more preferably 0.5 or more to 2 or less, and most preferably 0.7 or more to less than 1.5, per mole of the precious metal. When the concentration of the protective agent is within the aforementioned range, it is considered that both the precious metal and the first oxide or second oxide can be protected by the protective agent. The protected precious metal and first oxide or second oxide can be maintained in a state where an adjacent, similarly protected precious metal and first oxide or second oxide do not aggregate, and the dispersion of precious metal is high.

The first preparation step is preferably in the following order:
(1) milling the first oxide or the second oxide in a solvent,
(2) adding the nitric acid solution, (3) adding and mixing in the precious metal solution, and (4) adding and mixing in the protective agent.

(Reducing Step)

The reducing step is a step of mixing the first slurry with a reducing agent to obtain a reducing slurry. In the reducing step, precious metal ions are reduced by the reducing agent to produce precious metal nanoparticles. When the first oxide is used in the first preparation step, precious metal is supported on the first oxide, and when the second oxide is used in the first preparation step, precious metal is supported on the second oxide. When the first slurry contains a protective agent, the produced precious metal nanoparticles are protected by the protective agent, and thus the precious metal nanoparticles are prevented from aggregating. Although the reducing agent is not particularly limited, the reducing agent is preferably an organic compound. Furthermore, the reducing agent preferably does not contain any metal element. Examples of suitable reducing agents include hydrazines, sodium borohydride ($NaBH_4$), and organic acids. Considering that the precious metal is gradually reduced and unnecessary metal species are not introduced, ascorbic acid, which is an organic acid, is preferably used, and more preferably L(+)-ascorbic acid. In the reducing step, the reducing agent may be added to the first slurry, or the first slurry may be added to the reducing agent. A method of reducing precious metal ions with a reducing agent in the absence of the first oxide or second oxide is not preferable. The precious metal ions can be selectively supported on the first oxide or the second oxide by reduction using the reducing agent in the presence of the first oxide or the second oxide. If only the precious metal is reduced first, precious metal colloids are generated, and thus it is difficult to control adsorption onto the first oxide or the second oxide.

The molar ratio of the reducing agent to the precious metal is preferably 0.1 or more to 5.0 or less, more preferably 1.0 or more to 3.0 or less, and even more preferably 1.5 or more to 2.5 or less. When the molar ratio of the reducing agent to the precious metal is within the aforementioned range, precious metal ions can be sufficiently reduced without preventing the protective agent from protecting the precious metal nanoparticles.

The reducing step is preferably performed at a temperature of 10° C. or more to 40° C. or less. In the reducing step, the temperature of the first slurry and the reducing agent is preferably 10° C. or more to 40° C. or less. The particle diameter of the precious metal can be easily adjusted by performing the reducing step at around room temperature. In the reducing step, the first slurry and the reducing agent are preferably mixed for 10 minutes or more to 10 hours or less.

(Second Preparation Step)

The second preparation step is a step of preparing a second slurry containing the second oxide if the first oxide is used in the first preparation step, and a step of preparing a second slurry containing the first oxide if the second oxide is used in the first preparation step. The second preparation step preferably includes a step of milling a dispersion liquid containing the first oxide or the second oxide included in the second slurry. The second slurry can be obtained by (1) milling the target second oxide or first oxide and dispersing the milled material in an aqueous medium, or (2) milling the target second oxide or first oxide in an aqueous medium. Known milling machines such as a ball mill or the like can be used for milling.

The solvent of the second slurry is not particularly limited so long as the solvent is used for preparing an exhaust gas purification catalyst, and water or any organic solvent may be used. The solvent of the second slurry is preferably water or an alcohol, and is more preferably water.

(Mixing Step)

The mixing step is a step of mixing the reducing slurry and the second slurry to obtain a mixed slurry. The mixing of the reducing slurry and the second slurry can be performed by any known method. The mixing step is preferably performed under mild conditions so that the nanoparticles of the precious metal produced in the reducing step are not released. The reducing slurry and the second slurry are preferably mixed with a mixer to obtain a mixed slurry. Mixing with the mixer may be performed for 1 minute or more to 1 hour or less, and preferably for 5 minutes or more to 30 minutes or less. After the mixing step, the supporting step is preferably performed without performing wet milling. Thereby, a transfer of the precious metal on the first oxide to the second oxide can be suppressed, or the transfer of the precious metal on the second oxide to the first oxide can be suppressed.

An alkali earth metal compound is preferably added during the mixing step. For example, the reducing slurry, the second slurry, and the alkali earth metal compound may be mixed together, or the alkali earth metal compound may be added after the reducing slurry and the second slurry are mixed.

(Supporting Step)

The supporting step is a step of supporting the catalytic component on the three-dimensional structure.

The supporting step may be performed by applying the mixed slurry to the three-dimensional structure after the mixing step. Any known method can be used to apply the mixed slurry. For example, the slurry may be applied onto the three-dimensional structure by a wash-coating method.

Specifically, the supporting step may include contacting the slurry with the three-dimensional structure, removing excess slurry, performing a drying step if necessary, and then performing a calcining step, in that order. The drying step is primarily a step for removing any unnecessary solvent. The calcining step is primarily a step of removing the protective agent and reducing agent and affixing the precious metal onto the first or second oxide. The drying step and the calcining step may be performed as separate steps or may be performed continuously as the same step. Drying and calcining may each be performed independently in any atmosphere. For example, drying and calcining may be performed in air, in a reducing atmosphere containing a reducing gas such as hydrogen, in an inert gas atmosphere, or in a vacuum. The drying temperature may be 50° C. or more to 200° C. or less, and preferably 100° C. or more to 150° C. or less, and the drying time is preferably 10 minutes or more to 10 hours or less. The calcining temperature may be above 200° C. and 700° C. or less, and preferably 250° C. or more to 600° C. or less. The calcining time is preferably 10 minutes or more to 3 hours or less, and more preferably 15 minutes or more to 50 minutes or less.

The method of manufacturing the exhaust gas purification catalyst according to the present embodiment preferably includes one calcining step and does not include two or more calcining steps. By performing the calcining step once, a small average particle diameter of the precious metal and a large specific surface area of the precious metal, as well as a high selective loading ratio can be achieved, as compared to when the calcining step is performed two times or more.

[Purification Method of Exhaust Gas]

A method of purifying exhaust gas includes a step of causing exhaust gas to flow through the exhaust gas purification catalyst described above.

The method of purifying exhaust gas according to the present embodiment is particularly useful for a specific exhaust gas. The specific exhaust gas is an exhaust gas containing 10 ppm or more to 50,000 ppm or less of C0, 10 ppm or more to 50,000 ppm or less of a hydrocarbon in terms of carbon (C1), and 10 ppm or more to 50,000 ppm or less of nitrogen oxides. Purification of exhaust gas means that the CO in exhaust gas is oxidized to $CO_2$, hydrocarbons are oxidized to $H_2O$ and $CO_2$, and nitrogen oxides are reduced to $N_2$ and $H_2O$. In the present specification, the amount of hydrocarbon refers to the amount in terms of carbon (C1).

The amount of CO included in the exhaust gas is preferably 100 ppm or more to 10,000 ppm or less, and even more preferably 1000 ppm or more to 5000 ppm or less. The amount of hydrocarbons included in the exhaust gas in terms of carbon is preferably 1000 ppm or more to 30,000 ppm or less, and even more preferably 3000 ppm or more to 20,000 ppm or less. The amount of nitrogen oxide included in the exhaust gas is preferably 100 ppm or more to 10,000 ppm or less, and even more preferably 300 ppm or more to 3000 ppm or less.

The method of purifying exhaust gas according to the present embodiment may be used to purify exhaust gas from an internal combustion engine, and particularly may be used to purify exhaust gas from a gasoline engine. The exhaust gas may be supplied to the exhaust gas purification catalyst at a space velocity of 1000 $h^{-1}$ or more to 500,000 $h^{-1}$ or less, and preferably at a space velocity 5000 $h^{-1}$ or more to 150,000 $h^{-1}$ or less. Furthermore, the exhaust gas may be supplied at a linear velocity of 0.1 m/sec or more to 8.5 m/sec or less, and preferably at a linear velocity of 0.2 m/sec or more to 4.2 m/sec or less. When the exhaust gas is supplied at such a flow rate, the exhaust gas can be efficiently purified.

Furthermore, in the method of purifying exhaust gas according to the present embodiment, a high-temperature exhaust gas may be supplied in order to promote purification of the exhaust gas. For example, an exhaust gas at a temperature of 100° C. or more to 1000° C. or less may be supplied to the catalyst, and an exhaust gas of a temperature of 200° C. or more to 600° C. or less is preferably supplied. By supplying an exhaust gas of such a temperature, the exhaust gas can be purified with high efficiency while suppressing thermal aging of the catalyst.

EXAMPLES

The present invention is described below in detail using Examples and Comparative Examples, but the present invention is not limited to the Examples so long as the effects of the present invention are achieved.

Example 1

In Example 1, lanthana-alumina was used as a first oxide, an oxygen storage component was used as a second oxide, palladium was used as a precious metal, polyvinylpyrrolidone (PVP) was used as a protective agent, ascorbic acid (AA) was used as a reducing agent, and a three-dimensional structure made of cordierite was used as the three-dimensional structure.

A palladium nitrate solution serving as a Pd raw material, lanthana-alumina ($La_2O_3$:$Al_2O_3$=4:96 (mass ratio), average particle diameter d50 is 5 μm, and BET surface area is 172.4 $m^2$/g), the oxygen storage component ($CeO_2$:$ZrO_2$:$La_2O_3$=47:47:6 (mass ratio)), and barium sulfate, were weighed as raw materials such that the mass ratio of Pd:lanthana-alumina:oxygen storage component:barium sulfate after calcination was 1.8:45:45:6.5. After adding the weighed lanthana-alumina to distilled water, a slurry a1 with a pH of 10.7 was obtained by wet milling using a ball mill. Next, a 65% nitric acid aqueous solution was added to the slurry a1 while stirring until the pH was 1.4, and then the palladium nitrate solution was dripped and mixed in. Next, polyvinylpyrrolidone (PVP) was added at a ratio of 1 mol per 1 mol of palladium, and then the temperature was adjusted to 25° C. while stirring. Next, ascorbic acid (AA) at 25° C. was added at a ratio of 2 mols per 1 mol of palladium, and then stirred for 1 hour to obtain a reducing slurry a2.

The weighed oxygen storage component was dispersed in distilled water and wet milled using a ball mill to obtain a slurry a3.

The slurry a3 was added to the reduced slurry a2 and then stirred, and then weighed barium sulfate was added and stirred to obtain a mixed slurry a4.

The prepared mixed slurry a4 was wash-coated onto the three-dimensional structure made of cordierite (103 mm in diameter, 105 mm in length, cylindrical shape, 0.875 L, 600 cells/square inch) at 98.3 g per liter of the three-dimensional structure. Next, drying was performed at 150° C. for 15 minutes and then calcining was performed at 550° C. for 1 hour (first time) to obtain a catalyst A. Drying and calcining were performed in air. In Example 1, PVP and AA were used and calcining was performed only once.

Comparative Example 1

Each raw material was weighed at the same ratios as in Example 1. Next, lanthana-alumina serving as a first oxide and a palladium nitrate solution were added to distilled water and then mixed. Next, a powder b1 (palladium-supported lanthana-alumina) was obtained by drying at 120° C. for 12 hours in air and then calcining at 550° C. for 1 hour (first time). The aforementioned powder b1, an oxygen storage component serving as a second oxide similar to Example 1, and barium sulfate were dispersed in distilled water, and a slurry b2 was obtained by wet milling using a ball mill. The slurry b2 was wash-coated onto the three-dimensional structure in the same manner as in Example 1. After drying similarly to Example 1, calcining (second time) was performed to obtain a catalyst B. In Comparative Example 1, PVP and AA were not used and calcining was performed twice.

Comparative Example 2

Each raw material was weighed at the same ratios as in Example 1. Next, an oxygen storage component serving as a second oxide was added to distilled water and stirred, and then a slurry c1 was obtained by wet milling in a ball mill. Palladium nitrate was added to the slurry c1, and PVP was added at a ratio of 1 mol to 1 mol of palladium, which was then stirred for 5 minutes to a obtain slurry c2. Next, lanthana-alumina serving as a first oxide similar to Example 1 was dispersed in distilled water and wet milled in a ball mill to obtain a slurry c3. The slurry c3 was added to slurry c2 and stirred, and then barium sulfate was added similarly to Example 1 and stirred to obtain a slurry c4.

The mixed slurry c4 was wash-coated onto a three-dimensional structure made of cordierite in the same manner as in Example 1. Next drying and calcining (first time) were performed similarly to Example 1 to obtain a catalyst C. In Comparative Example 2, AA was not used and calcining was performed only once.

Comparative Example 3

Each raw material was weighed at the same ratios as in Example 1. Next, an oxygen storage component serving as a second oxide was added to distilled water and stirred, and then a slurry d1 was obtained by wet milling in a ball mill. Palladium nitrate was added to the slurry d1 and then stirred for 5 minutes to obtain a slurry d2. Next, lanthana-alumina serving as a first oxide similar to Example 1 was dispersed in distilled water and wet milled in a ball mill to obtain a slurry d3. The slurry d3 was added to slurry d2 and stirred, and then barium sulfate was added similarly to Example 1 and stirred to obtain a slurry d4.

The mixed slurry d4 was wash-coated onto a three-dimensional structure made of cordierite in the same manner as in Example 1. Next, drying and calcining (first time) were performed similarly to Example 1 to obtain a catalyst D. In Comparative Example 3, PVP and AA were not used and calcining was performed only once.

Example 2

Each raw material was weighed at the same ratios as in Example 1. Next, an oxygen storage component serving as a second oxide was added to distilled water, and then a slurry e1 with a pH of 9.3 was obtained by wet milling in a ball mill. A 65% nitric acid aqueous solution was added to the slurry e1 while stirring until the pH was 1.0, and then the palladium nitrate solution was dripped and mixed in. Next, PVP was added at a ratio of 1 mol per 1 mol of the palladium stirred, and then maintained at 25° C. Next, AA at 25° C. was added at a ratio of 2 mols per 1 mol of the palladium, and then mixed for 1 hour to obtain a reducing slurry e2.

Lanthana-alumina serving as a first oxide similar to Example 1 was dispersed in distilled water and wet milled in a ball mill to obtain a slurry e3.

The slurry e3 was added to the reduced slurry e2 and then stirred, and then barium sulfate was added and stirred to obtain a mixed slurry e4.

The mixed slurry e4 was wash-coated onto a three-dimensional structure made of cordierite in the same manner as in Example 1. Next, drying and calcining (first time) were performed similarly to Example 1 to obtain a catalyst E. In Example 2, PVP and AA were used and calcining was performed only once.

Comparative Example 4

Each raw material was weighed at the same ratios as in Example 1. Next, an oxygen storage component serving as a second oxide and a palladium nitrate solution were added to distilled water, mixed, dried at 120° C. for 12 hours and calcined at 550° C. for 1 hour (first time) in air to obtain a powder f1 (La-containing (Ce,Zr) $O_2$ supporting palladium). The aforementioned powder f1, lanthana-alumina serving as a first oxide similar to Example 1, and barium sulfate were dispersed in distilled water, and a slurry f2 was obtained by wet milling using a ball mill. The slurry f2 was wash-coated onto the three-dimensional structure in the same manner as in Example 1. Next, drying and calcining (second time) were performed similarly to Example 1 to obtain a catalyst F. In Comparative Example 4, PVP and AA were not used and calcining was performed twice.

Comparative Example 5

Each raw material was weighed at the same ratios as in Example 1. Next, a palladium nitrate solution was added to distilled water. Polyvinylpyrrolidone (PVP) was added to the solution at a ratio of 1 mol per 1 mol of the palladium, and then the temperature was adjusted to 25° C. while stirring. Next, ascorbic acid (AA) at 25° C. was added at a ratio of 2 mols per 1 mol of the palladium, and then stirred for 1 hour to obtain a colloidal dispersion liquid g1. Next, lanthana-alumina serving as a first oxide was dispersed in the colloidal dispersion liquid g1 and stirred for 30 minutes to obtain a slurry g2. Next, an oxygen storage component serving as a second oxide was added to the slurry g2 and then stirred. Weighed barium sulfate was added to the reduced slurry g2 and then stirred. Wet milling was performed in a ball mill to obtain a slurry g3.

The slurry g3 was wash-coated onto the three-dimensional structure in the same manner as in Example 1. Next, drying and calcining (first time) were performed similarly to Example 1 to obtain a catalyst G. In Comparative Example 5, PVP and AA were used to perform the reduction of palladium under conditions where the first and second oxides are not present. Calcining was performed only once.

<Evaluation of Exhaust Gas Purification Catalyst>

[Electron Beam Microanalyzer (EPMA)]

The exhaust gas purification catalysts obtained in the Examples and Comparative Examples were analyzed by an EPMA. A JXA-8530F manufactured by JEOL Ltd. was used as an analyzing device. Measurements were performed under the measurement conditions of an acceleration voltage of 15 kV, a beam current of 10 nA, and an analysis region of a 20 μm square (200×200 field of view, measurement interval 0.1 μm), and the distributions of aluminum (Al), palladium (Pd), and zirconium (Zr) were identified.

Thereafter, image processing was performed to obtain the area of a first region where the distribution of the Al included in the lanthana-alumina serving as the first oxide and the distribution of Pd serving as the precious metal overlap. Similarly, the area of a second region was obtained where the distribution of Zr included in the oxygen storage component serving as the second oxide and the distribution of Pd serving as the precious metal overlap. From the obtained values, the selective loading ratio on the first oxide (selective loading ratio on Al) and the selective loading ratio on the second oxide (selective loading ratio on CZ) were calculated. The calculated values are shown in Table 1.

[Carbon Monoxide (CO) Pulse Adsorption Method]

The amount of CO adsorption of the exhaust gas purification catalysts obtained in the Examples and Comparative Examples was measured using a commercially available fully automated catalytic gas adsorption measuring device (R-6015 manufactured by HEMMI Slide Rule Co., Ltd.). The measured amounts of CO adsorption are shown in Table 1.

The procedure of measuring the amount of CO adsorption is shown below.

(1) A sample was placed in the device described above, a gas containing 100 volume % oxygen at 400° C. was passed through for 10 minutes, helium gas was passed through, helium gas containing 5 volume % hydrogen at 500° C. was passed through for 15 minutes, then helium gas was passed through at 500° C. and then cooled to 50° C.

(2) The sample was maintained at 50° C., "0.1585 ml of helium gas containing 50.1 volume % of CO" was introduced into the sample as a CO pulse, and the amount of CO contained in the gas discharged downstream of the sample relative to the pulse was measured.

(3) The CO pulses were repeatedly introduced into the sample until the CO volumetric concentration discharged from downstream of the sample after introducing the CO pulses was the same as the CO volumetric concentration of the CO pulses.

(4) The difference between the integrated value of the amount of CO included in all CO pulses and the integrated value of the amount of CO discharged downstream of the sample was calculated and used as the total amount of CO adsorbed onto the sample (mL).

(5) The procedure described in (1) above was repeated, the sample was removed at room temperature, and the mass of the sample was measured.

(6) The mass of the precious metal included in the sample was obtained by multiplying the ratio of the precious metal included in the sample determined during sample preparation by the mass of the sample.

(7) The value (CO adsorption amount (mL/g)) obtained by dividing the total amount of CO adsorbed on the sample calculated in (4) described above by the mass (g) of the precious metal included in the sample determined in (6) described above was set as the amount of CO adsorption of the sample.

TABLE 1

| CATALYST | SELECTIVE LOADING RATIO ON FIRST OXIDE [%] | SELECTIVE LOADING RATIO ON SECOND OXIDE [%] | AMOUNT OF CO ADSORBED [ml/Pd (1 g)] |
|---|---|---|---|
| A | 93.3 | 6.7 | 37.3 |
| B | 91.8 | 8.2 | 11.6 |
| C | 50.1 | 49.9 | 40.5 |
| D | 55.3 | 44.7 | 25.0 |
| E | 1.1 | 98.9 | 38.1 |
| F | 7.5 | 92.5 | 13.7 |
| G | 59.7 | 40.3 | 13.0 |

In catalyst A and catalyst E in the Examples, palladium is selectively supported on the first oxide or on the second oxide, and palladium is selectively supported with a higher amount of CO adsorption than on the catalysts in the Comparative Examples. On the other hand, in catalyst B and catalyst F in the Comparative Examples, which were calcined twice, the selective loading ratios are high, but palladium is supported with low CO adsorption. Furthermore, even if the calcining step is done one time only, in the catalyst C and catalyst D, which did not use at least one of PVP and AA, the amount of CO adsorption is relatively high, but the selective loading ratio is close to 50%. Furthermore, in the catalyst G prepared using colloids, the selective loading ratio is low and the amount of CO adsorption is low.

[Measurement of Light-Off Temperature]

The exhaust gas purification performance of the catalysts A, B, and D was measured via a warm-up test. Each catalyst was placed on the downstream side of an exhaust port of an inline four-cylinder, two-liter engine. Exhaust gas was supplied to the exhaust gas purification catalyst under the conditions of an air-fuel ratio (A/F)=14.6±1, A/F fluctuation rate=1 Hz, and space velocity (SV)=12500 ($h^{-1}$). The temperature of the catalyst was raised from 100° C. to 500° C., and the composition of the exhaust gas before and after passing through the catalyst was analyzed, T50 determines the temperature at which the purification rate of CO, HC and NOx reaches 50%. The results are shown in Table 2. As the temperature of T50 decreases, the purification performance of the catalyst increases.

From the results in Table 2, it can be seen that the catalyst A of the Examples, which has a high selective loading ratio and a high number of precious metal atoms that can contact the gas, has a lower T50 than the catalyst B of the Comparative Examples, which has having a high selective loading ratio but a low number of precious metal atoms that can contact the gas, and the catalyst D of the Comparative Examples, which has a low selective loading ratio.

TABLE 2

| CATALYST | T50 (CO) [° C.] | T50 (HC) [° C.] | T50 (NOx) [° C.] |
| --- | --- | --- | --- |
| A | 252 | 253 | 241 |
| B | 272 | 273 | 261 |
| D | 274 | 273 | 263 |

INDUSTRIAL APPLICABILITY

The exhaust gas purification catalyst according to the present disclosure can provide excellent exhaust gas purification performance.

The method of purifying exhaust gas according to the present disclosure can efficiently purify exhaust gas.

The method of manufacturing an exhaust gas purification catalyst according to the present disclosure can provide an exhaust gas purification catalyst having excellent exhaust gas purification performance.

DESCRIPTION OF REFERENCE NUMERALS

10: Three-dimensional structure
21: First oxide
22: Second oxide
30: Precious metal
100: Catalytic component

What is claimed is:

1. An exhaust gas purification catalyst, comprising a three-dimensional structure and a catalytic component, the catalytic component comprising a single layer having a first oxide, a second oxide, and precious metal,
   wherein the catalytic component is supported on the three-dimensional structure,
   wherein the first and second oxides are different types of oxide particles;
   wherein the ratio of the amount of precious metal supported on the first oxide to the total amount of precious metal supported on the first oxide and precious metal supported on the second oxide, or the ratio of the amount of precious metal supported on the second oxide to the total amount of precious metal supported on the first oxide and precious metal supported on the second oxide is 70% or more to 100% or less, as measured by an electron probe microanalyzer (EPMA), and
   wherein the amount of carbon monoxide that the precious metal can adsorb per unit mass is 15 mL/g or more to 100 mL/g or less.

2. The exhaust gas purification catalyst according to claim 1, wherein the first oxide contains aluminum.

3. The exhaust gas purification catalyst according to claim 1, wherein the second oxide contains cerium.

4. The exhaust gas purification catalyst according to claim 1, wherein the first oxide contains a rare-earth element (excluding cerium).

5. The exhaust gas purification catalyst according to claim 1, wherein the second oxide contains a rare-earth element (excluding cerium).

6. The exhaust gas purification catalyst according to claim 1, further comprising an alkaline-earth metal compound.

7. The exhaust gas purification catalyst according to claim 1, produced by a method comprising the following steps:
   (S1) a first preparation step of preparing a first slurry containing the first oxide or the second oxide and a precious metal solution;
   (S2) a reducing step following the first preparation step of mixing the first slurry with a reducing agent to obtain a reducing slurry;
   (S3) a second preparation step following the reducing step of preparing a second slurry, (a) containing the second oxide if the first oxide was used in the first preparation step, or (b) containing the first oxide if the second oxide was used in the first preparation step;
   (S4) a mixing step following the second preparation step of mixing the reducing slurry and the second slurry to obtain a mixed slurry; and
   (S5) a supporting step following the mixing step of supporting the mixed slurry on a three-dimensional structure.

8. The exhaust gas purification catalyst according to claim 1, wherein the single layer is a calcined washcoat layer.

9. The exhaust gas purification catalyst according to claim 1, wherein the supported single layer is in direct contact with the three-dimensional structure.

10. The exhaust gas purification catalyst according to claim 1, wherein the different types of oxide particles include having the first oxide and the second oxide of different material compositions.

11. The exhaust gas purification catalyst according to claim 10, wherein the material composition difference includes one of the first and second oxides being comprised of a refractory inorganic oxide (excluding an oxygen storage material), and the other of the first and second oxides being an oxygen storage material.

12. The exhaust gas purification catalyst according to claim 10, wherein the precious metal provided on one of the first and second oxides has reducing agent reduction formed nanoparticles, while precious metal, if provided on the other of the first and second oxides, is in a non-reduced state.

13. A method of purifying exhaust gas, comprising a step of causing exhaust gas to flow through the exhaust gas purification catalyst according to claim 1.

14. A method of manufacturing an exhaust gas purification catalyst according to claim 1, comprising:
- (S1) a first preparation step of preparing a first slurry containing the first oxide or the second oxide and a precious metal solution;
- (S2) a reducing step of mixing the first slurry with a reducing agent to obtain a reducing slurry;
- (S3) a second preparation step, following the reducing step, of preparing a second slurry, (a) containing the second oxide if the first oxide was used in the first preparation step, or (b) containing the first oxide if the second oxide was used in the first preparation step;
- (S4) a mixing step following the second preparation step of mixing the reducing slurry and the second slurry to obtain a mixed slurry; and
- (S5) a supporting step, following the mixing step, of supporting the mixed slurry on a three-dimensional structure.

15. The method of manufacturing an exhaust gas purification catalyst according to claim 14, wherein the first preparation step includes a step of adding a protective agent which protects the precious metal.

16. The method of manufacturing an exhaust gas purification catalyst according to claim 14, wherein the first slurry contains the first oxide, and the first preparation step includes a step of milling the first oxide.

17. The method of manufacturing an exhaust gas purification catalyst according to claim 14, wherein the second slurry contains the second oxide, and the second preparation step includes a step of milling the second oxide.

18. The method of manufacturing an exhaust gas purification catalyst according to claim 14, wherein the reducing agent is an organic compound.

19. The method of manufacturing an exhaust gas purification catalyst according to claim 14, wherein the reducing step is performed at a temperature of 10° C. or more to 40° C. or less.

20. An exhaust gas purification catalyst, comprising a three-dimensional structure and a catalytic component, the catalytic component comprising a common layer having a first oxide, a second oxide, and precious metal,
- wherein the catalytic component is supported on the three-dimensional structure,
- wherein the first and second oxides have different material compositions;
- wherein the ratio of the amount of precious metal supported on the first oxide to the total amount of precious metal supported on the first oxide and precious metal supported on the second oxide, or the ratio of the amount of precious metal supported on the second oxide to the total amount of precious metal supported on the first oxide and precious metal supported on the second oxide is 70% or more to 100% or less, as measured by an electron probe microanalyzer (EPMA), and
- wherein the amount of carbon monoxide that the precious metal can adsorb per unit mass is 15 mL/g or more to 100 mL/g or less.

21. The exhaust gas purification catalyst according to claim 20, wherein the different material compositions include one of the first and second oxides being comprised of a refractory inorganic oxide (excluding an oxygen storage material) and the other of the first and second oxides being an oxygen storage material.

* * * * *